(12) United States Patent
Audebert (10) Patent No.: US 10,338,248 B2
(45) Date of Patent: Jul. 2, 2019

(54) METHOD FOR PROCESSING SEISMIC IMAGES

(71) Applicant: Total SA, Courbevoie (FR)

(72) Inventor: François Audebert, Pau (FR)

(73) Assignee: TOTAL SA, Courbevoie (FR)

( * ) Notice: Subject to any disclaimer, the term of this patent is extended or adjusted under 35 U.S.C. 154(b) by 309 days.

(21) Appl. No.: 15/303,961

(22) PCT Filed: Apr. 9, 2015

(86) PCT No.: PCT/FR2015/050962
§ 371 (c)(1),
(2) Date: Dec. 22, 2016

(87) PCT Pub. No.: WO2015/159000
PCT Pub. Date: Oct. 22, 2015

(65) Prior Publication Data
US 2017/0176615 A1 Jun. 22, 2017

(30) Foreign Application Priority Data
Apr. 14, 2014 (FR) ...................... 14 53327

(51) Int. Cl.
*G01V 1/30* (2006.01)
*G01V 1/32* (2006.01)
*G01V 1/36* (2006.01)

(52) U.S. Cl.
CPC ............. *G01V 1/303* (2013.01); *G01V 1/308* (2013.01); *G01V 1/325* (2013.01); *G01V 1/36* (2013.01);
(Continued)

(58) Field of Classification Search
CPC .............................. G01V 1/308; G01V 1/303
(Continued)

(56) References Cited

U.S. PATENT DOCUMENTS

2007/0247972 A1   10/2007   Aarre et al.
2008/0106971 A1   5/2008    Wang et al.
(Continued)

FOREIGN PATENT DOCUMENTS

FR    10/55945 A       2/1954
FR    10/57508 A       3/1954
WO    WO 2014/018704 A1   1/2014

OTHER PUBLICATIONS

International Search Report for PCT/FR2015/0505962, dated Apr. 1, 2016, 12 pages.
(Continued)

*Primary Examiner* — Eman A Alkafawi
(74) *Attorney, Agent, or Firm* — Patterson Thuente Pedersen, P.A.

(57) ABSTRACT

The invention relates to a method for processing seismic images containing a reference trace and a control trace. During said method, a reference level and a recording level are defined. Then, the control trace is transformed on the reference level by means of a velocity model. A portion of the reference trace including the recording level is transformed by means of a current velocity model. A portion of the transformed control trace including the recording level is corrected by means of the current velocity model. Finally, an optimized current velocity model is determined.

10 Claims, 8 Drawing Sheets

(52) U.S. Cl.
CPC .... *G01V 2210/161* (2013.01); *G01V 2210/25* (2013.01); *G01V 2210/512* (2013.01); *G01V 2210/53* (2013.01); *G01V 2210/6122* (2013.01)

(58) Field of Classification Search
USPC .......................................................... 702/18
See application file for complete search history.

(56) References Cited

U.S. PATENT DOCUMENTS

| | | |
|---|---|---|
| 2008/0291781 A1 | 11/2008 | Williamson et al. |
| 2013/0121112 A1 | 5/2013 | Thore et al. |
| 2013/0176822 A1 | 7/2013 | Thore et al. |
| 2014/0149046 A1* | 5/2014 | Baina ..................... G01V 1/282 702/14 |
| 2015/0168574 A1* | 6/2015 | Wallet ..................... G01V 99/00 367/53 |

OTHER PUBLICATIONS

English translation of International Search Report for PCT/FR2015/0505962, dated Apr. 1, 2016 3 pages.
PCT Written Opinion for PCT/FR2015/0505962, dated Apr. 1, 2016, 7 pages.
English translation of PCT Written Opinion for PCT/FR2015/0505962, dated Apr. 1, 2016, 8 pages.
Bin Wang et al: "3D Sub-salt tomography based on wave equation migration perturbation scans", SEG Technical Program Expanded Abstracts 2004, Jan. 1, 2004 (Jan. 1, 2004), pp. 2375-2378, XP055159416, DOI: 10.1190/1.1839699.

* cited by examiner

METHOD FOR PROCESSING SEISMIC IMAGES

RELATED APPLICATIONS

The present application is a National Phase entry of PCT Application No. PCT/FR2015/050962 filed Apr. 9, 2015, which claims priority from FR Patent Application No. 1453327, filed Apr. 14, 2014, said applications being hereby incorporated by reference herein in their entirety.

FIELD OF THE INVENTION

The invention relates to the field of the processing of seismic images. It relates more particularly to the comparison of two images of the same medium taken at different instants with a view to identifying changes in the imaged medium.

BACKGROUND OF THE INVENTION

Seismic imaging involves acoustic waves emitted in the sea or on the surface and which propagate through a medium, undergoing therein, among other things, reflections and refractions. These waves are then recorded in the form of signals by means of sensors such as geophones. These signals are in the form of seismic traces representing the variations in amplitude of a wave as a function of time.

To monitor the change over time in a geological medium, the seismic imaging proceeds by successive acquisitions of seismic data with the same sources and detectors. It is usual to refer to such monitorings by speaking of "quadridimensional or 4D seismic imaging". Such monitoring proves to be useful for surveying hydrocarbon deposits. It is for example desirable to know the influence of exploitation on the properties of oil or gas reservoirs, with a view to preventing any collapses.

Exploitation of a deposit causes a reduction in the quantity of hydrocarbons present in a reservoir, which may affect the composition of the surrounding rocks and disturb the speeds of propagation of seismic waves passing through this modified medium. These changes have an effect at the detectors through different recorded arrival times, inviting the updating of the velocity model used for modelling the propagation of the seismic waves in the imaged medium and the construction of a representation of this medium.

However, such monitoring involves digital processing operations that may be lengthy because of the large volume of data accumulated. Moreover, the monitoring generally suffers from lack of precision because of the difficulty existing in identifying the small variations that occur between two acquisitions. A compromise between speed, simplicity of processing and precision is therefore in particular sought.

The seismic imaging method by means of which a physical model is obtained from seismic data is a so-called inversion method. Various inversion methods have been proposed to implement 4D imaging.

One simplistic technique consists in considering all the interfaces reflecting the seismic waves, also referred to as reflectors, as being planar reflectors in the imaged medium, and carrying out the imaging in one dimension, referred to as 1D imaging. This method has the advantage of being quick, but very inadequate since the reliability of the image degrades rapidly with depth. In addition, it provides information only along one axis whereas a representation in three dimensions is sought. It is possible, by way of example of methods using 1D imaging techniques, to consult the patents FR 10/55945 and FR 10/57508, defining respectively a digital method for modelling changes in a stratified model and a method for extrapolating a 3D model from 1D measurements along a well.

An improved version of 1D imaging consists in orienting the detection axis perpendicular to an interface or a set of interfaces with a known non-zero inclination. This technique does however prove to be ineffective for detecting complex structures, for example reservoirs in the form of domes, or imaging with sufficient precision mediums having reflectors of variable inclination.

Another approach consists in solving the complete problem of inversion in three dimensions from a plurality of seismic signals emitted in the three directions in space. This so-called "full-wave inversion" technique makes it possible to cross-check redundant information and to obtain a more realistic three-dimensional image of the medium. However, it proves to be extremely expensive in terms of time. The slowness of this technique in practice makes it applicable only at low frequencies of no more than 15 Hz. In the end, this technique is therefore not sensitive to small changes in the medium occurring at scales lower than the wavelength of the seismic waves used.

Consequently, an inversion technique is sought suitable for 4D imaging that is rapid while offering sufficient precision and resolution to be able to detect reservoirs having complex structures, for example in the form of a dome.

SUMMARY OF THE INVENTION

In order to respond to the problems disclosed above, the present invention proposes a method for processing a reference seismic image of a medium and a control seismic image of said medium. The reference seismic image comprises at least one seismic trace described in a depth scale and the control seismic image comprises at least one seismic trace described in the depth scale. The method comprises the following steps:

a) receiving the reference seismic image and the control seismic image; and b) defining at least one first planar capture level situated on one of the traces from among the seismic trace of the reference image and the seismic trace of the control image, and at least one second planar capture level on the seismic trace of the reference image; and c) transforming a continuous portion of the seismic trace of the control image by demigration on the first capture level by means of an original velocity model, into a transformed control seismic trace described in a time scale; and d) transforming a continuous portion of the seismic trace of the reference image comprising the second capture level by demigration on the second capture level by means of a current velocity model, into a transformed reference seismic trace portion described in the time scale; and e) correcting the portion of the transformed control seismic trace by calibration on the second capture level by means of the current velocity model in a new transformed control seismic trace portion described in the time scale; and f) determining an optimised current velocity model by the addition, to the current velocity model, of a correction factor for the current velocity model determined from an offset in time between the portion of the transformed reference seismic trace and the new transformed control seismic trace portion.

The invention thus relates to two different images of the same medium in order to extract a velocity model suitable for faithfully modelling the medium from data of the control image. The reference image and the control image may in particular differ in that they are representations of the medium at different instants. Thus the velocity model obtained by the method makes it possible to provide a reliable image of the medium of the control image. A comparison between a plurality of images taken at different instants makes it possible to monitor the changes occurring in the medium, for exploitation of a hydrocarbon deposit.

The method makes it possible to obtain an optimised velocity model by rapid processing techniques, such as for example zero-offset depth imaging techniques, able to offer sufficient resolution with post-processing tools usually used in 4D seismic imaging, based on 1D hypotheses. One of the advantages of the invention compared with the prior art consists in the fact that no 1D reducing hypothesis is made on the structure of the subsoil or imaged medium. The invention involves the use of 4D processing techniques providing precise results while benefitting from advantages in terms of simplicity of computing that are found traditionally in 1D computations. To do this, the method defines planar levels on the seismic traces of the images acquired, in depth scale, in order to apply a correction by calibration to the data, a technique commonly referred to as "datuming". The "datuming" consists in transporting and rewriting these data, in a time domain, to another planar capture level defined by the user as if they were recorded at this capture level. The invention also uses demigration, which is another technique similar to "datuming". Transformation by demigration consists in converting images in depth scale into data in time scale, as if they had been recorded at a planar reference level defined by the user.

The method advantageously transforms data issuing from two different images in depth scale with a view to making them comparable, by the use of the same current velocity model to transform the same portions of seismic traces comprising a predefined capture level serving as a time origin after demigration or "datuming". The portions of processed seismic traces may lie between levels forming boundaries delimiting said portions, these boundaries being able to be defined by a user of the method. The obtaining of a correction factor for the current velocity model at step g) may be implemented by known techniques, in particular by evaluating the offset in time between the signal of the portion of the transformed referenced seismic trace and the new transformed control seismic trace portion, for example by means of a correlation of these two portions.

The invention provides another advantage compared with the prior techniques of post-processing of 4D images, which were based on hypotheses of a 1D medium for monitoring the change in a medium over time. This is because the invention makes it possible to use standard depth imaging tools, and more particularly in a simple "zero-offset" version, to perform demigration and "datuming" operations. These operations make it possible to manage propagation in a complex medium both in the surrounding environment and the actual structuring of the target reservoirs. The use of these 3D depth imaging tools in steps c)-e) makes it possible to use conventional 4D processing tools in order to determine reliably an optimised velocity model, in the presence of complex structures, for example a dome shape.

When the control and reference seismic images are composed of a plurality of seismic traces, the method makes it possible to reconstitute a three-dimensional model of the medium.

According to one embodiment, step f) of the method may comprise:

calculating a function $dv(t)$ representing the change over time in the instantaneous velocity making it possible to transform the transformed reference seismic trace portion into the new transformed control seismic trace portion;

transforming the function $dv(t)$ into a function $dv(z)$ representing value of the instantaneous velocity on the depth scale, by means of the current velocity model, the function $dv(z)$ forming a correction factor for the current velocity model.

Obtaining an optimised velocity model may involve a conversion of a correction factor $dv(t)$ for the velocity from a time scale to a depth scale. Calculating the function $dv(t)$ may be obtained by a method normally referred to as "warping". The transformation of the function $dv(t)$ into a function $dv(z)$ involves a method normally referred to as "migration" in geophysics. A migration from $dv(t)$ to $dv(z)$ by means of the current velocity model represents a simple and direct way of obtaining the correction factor $dv(z)$ for updating the current velocity model. The use of migration for obtaining the correction factor $dv(z)$ constitutes an improvement compared with the approaches of the prior art of simple conversion, which considers only one global velocity for a seismic trace portion, obtained from an offset in time between the traces.

According to another embodiment, step f) of the method may comprise:

calculating a function $dv(t)$ representing the change over time in the instantaneous velocity making it possible to transform the transformed reference seismic trace portion into the new transformed control seismic trace portion;

multiplying the function $dv(t)$ by any of the seismic traces described in the time scale, said seismic trace described in the time scale forming a support trace;

transforming, using the current velocity model, the support trace and the support trace multiplied by the function $dv(t)$ into second and third transformed traces described in the depth scale;

determining a correction factor $dv(z)$ representing the instantaneous velocity on the depth scale, of the current velocity model, said factor being the ratio between the second and third transformed traces described in the depth scale.

This alternative approach for obtaining the correction factor $dv(z)$ for the velocity model relies on a technique normally referred to as "migration of attributes". It can provide more precise results, in a more robust and less noisy fashion.

Advantageously, the control and reference seismic traces may be traces corresponding to zero-offset seismic profiles.

Zero-offset seismic profiles means that the seismic traces correspond to waves propagating in the subsoil from an emitter to a receiver situated at the same point as the emitter. In very simple cases, referred to as 1D, the waves follow the same path, which may be in a single vertical direction, during the propagation thereof from an emitter to a reflector situated on the surface and during propagation thereof from the reflector to the detector. In a complex environment, the outward and return path may be more complicated but it can be managed by the existing depth imaging tools. It is usual to refer to this type of seismic profile as zero-offset traces, corresponding to a zero offset between emitter and receiver. When emitters and receivers are not located at the same place, a known digital processing makes it possible to reconstitute a set of seismic data corresponding to a zero-offset seismic profile.

The advantage of zero-offset seismic profiles is that they make it possible to simplify the computations by a factor of $10^4$ compared with seismic traces obtained when the receivers are offset with respect to the receiver.

Advantageously, the current velocity model may be chosen as being the original velocity model.

This particular choice has the advantage of requiring no particular step of estimating a velocity model, which simplifies the method. It is also advantageous since the optimised current velocity model sought is intended to best model the medium of the control image. The original velocity model, having served to produce the control seismic image, thus constitutes a relevant starting point for converging towards an improved model by virtue of the method of the invention.

According to one embodiment, the transformation by demigration of step d) may consist of a first demigration step on the first capture level by means of the current velocity model followed by a second step of correction by calibration on the second capture level by means of the current velocity model.

In principle, it may be more convenient to perform the transformation by demigration of step d) in a single step by effecting a demigration directly on the second capture level. However, it is also possible to proceed first of all with a transformation by demigration on the first capture level and then to carry out "datuming" from the first capture level to the second capture level in order to obtain a transformed reference seismic trace portion having a time origin situated at a position corresponding to that of the second capture level.

According to an advantageous embodiment, steps d) to f) of the method may be repeated iteratively a chosen number of times, the optimised current velocity model determined at the end of an iteration serving as a current velocity model for the following iteration.

The iteration of steps d) to f) makes it possible to make the optimised current velocity model converge towards a model that is more and more coherent with respect to the differences between the reference and control seismic traces. The number of iterations may be chosen according to a computing time criterion, or according to a criterion of difference threshold between the values of a current velocity model and an optimised velocity model at the end of an iteration.

In particular, the reference level and the capture level or levels may be redefined at the start of each iteration of the method.

In this way, it is possible to converge more quickly when the optimised current velocity model is computed, by defining finer and finer levels for the steps of demigration, "datuming" and selection of seismic trace portions. It is also possible to accelerate the method by reducing the number of capture levels in an iteration loop when it turns out that the velocity model changes by only a small percentage locally from one iteration to the following one.

According to an advantageous embodiment, a plurality of capture levels going successively, by increasing depth according to the depth scale, from a first capture level to a last capture level, may be defined between step a) and step b). At the end of step e), a step g) is implemented during which the second capture level may be named the first capture level and the third capture level may be named the second capture level. Steps c) to g) may be implemented iteratively until the last capture level is named the first capture level.

By defining a plurality of capture levels, it is possible to concentrate the computation efforts on the regions of the medium comprising the most changes between the reference image and the control image. Such changes may in particular coincide with discontinuities. The method of the invention can then differentiate the number of iterations according to changes undergone locally over time, in order to reconstitute a locally more reliable model best reflecting the local changes to the velocity model.

By processing the seismic traces of a seismic image portion by portion in accordance with successive capture levels, the invention makes it possible to correct step by step errors in a velocity model. The method of the invention does not suffer from drawbacks of the prior art of 4D processing. The method of the invention does not depend on 1D hypotheses on the medium and does not restrict the propagation of the waves in purely vertical directions.

The invention also relates to a computer program product containing instructions for implementing steps a) to f) of the method, when this program is executed by a processor.

BRIEF DESCRIPTION OF THE FIGURES

The method that is the subject matter of the invention will be understood better from a reading of the following description of example embodiments presented by way of illustration, in no way limitatively, and from an observation of the following drawings, in which.

For reasons of clarity, the dimensions of the various elements shown in these figures are not necessarily in proportion to their actual dimensions. In the figures, identical references correspond to identical elements.

DETAILED DESCRIPTION OF THE FIGURES

In order to provide a model of the subsoil, the invention first of all uses depth imaging before 3D addition, which is a simplified version of 3D inversion ("full-wave inversion or FWI"). A velocity model is initially determined in this 3D imaging technique. At least one seismic trace of each firing point, or emission point, is then "migrated" into the velocity model determined. The migration consists of transforming data represented in a time scale into data positioned on a depth scale. The operation of positioning on a depth scale traces measured during acquisition phases is therefore delegated to this 3D depth imaging step. This operation is the theoretical equivalent of a first iteration of FWI. It is now entirely standard and conventional to provide such depth "migrated" images during a 4D seismic study.

Being situated downstream of this depth imaging process, the invention benefits, compared with FWI, from a reduction in dimensionality. This is because these migrated images, obtained by processing data issuing from a large number of emission points each comprising a large number of receivers, are conceptually equivalent to an image produced by "zero-offset" migration, considering only "zero-offset" seismic traces in which source points and receivers are merged. The processes of imaging, migration and demigration known as "zero offset" have been known for a long time and are several orders of magnitude less expensive than emission point (pre-stack) processes.

The invention described below is positioned downstream of the obtaining of depth migrated images before addition ("stack"), and makes the conceptually acceptable hypothesis that these so-called reference and control seismic images may relate to processes of demigration, datuming and the like, referred to as "zero offset".

Figure 1:
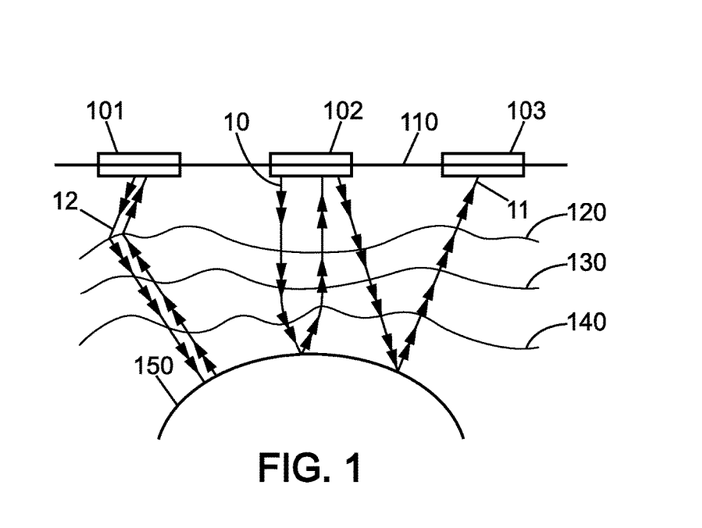
FIG. 1 is a schematic representation of lines propagating in a geological medium between emitters and receivers of seismic waves.

In order to provide a model of the subsoil, the method of the invention relies on data obtained by seismic reflection. As illustrated in FIG. 1, the seismic reflection uses emitters and receivers 101, 102, 103 of seismic signals. The seismic waves emitted propagate in a medium in the three dimensions in space. Rays 10 and 11 in FIG. 1 illustrate examples of paths followed by these waves. The discontinuities 120, 130, 140 and 150 of the medium give rise to reflections and refractions of these waves, which may be diverted and recorded on the surface at a point distant from their emission place, as shown by ray 11.

The seismic waves propagating in the subsoil are spherical waves. Consequently ray 12 in FIG. 1 illustrates a possible propagation between a source 101 and a detector situated at the same place as the source 101. Ray 10 illustrates a conventional 1D propagation in a single vertical direction.

The invention presented below can be implemented on seismic data issuing from measurements relating to rays similar for example to any of the rays 10, 11, 12 presented in FIG. 1. The originality of the invention lies in the use of simple techniques making it possible to extract reliable information without making rough 1D approximations on the structure of the subsoil.

A change in the properties of the medium effect the seismic data by a variation in the recorded seismic trace. A change in properties may occur locally following the exploitation of a hydrocarbon deposit delimited for example by the discontinuity 150.

Figure 2:
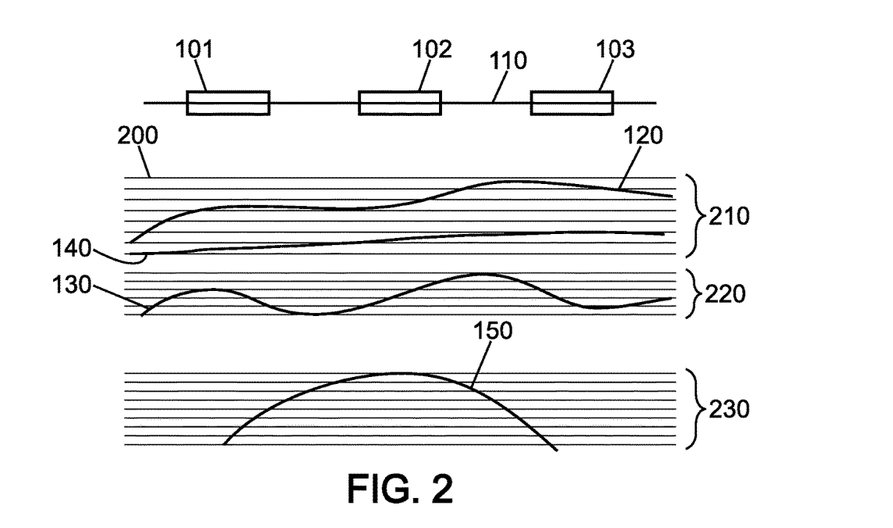
FIG. 2 is a schematic representation of a geological environment cut by planar capture levels.

As illustrated in FIG. 2, the invention proposes to delimit regions in the imaged medium in order to concentrate the data processing efforts on the regions containing most discontinuities 120, 130, 140, 150, and in particular the regions that undergo the most changes in properties over time. To do this, a set of planar capture levels 210, 220, 230 make it possible to form an artificial meshing of the medium. A first capture level 200 used during the implementation of the invention is called the reference plane. This plane is advantageously chosen so that there are no modifications to the medium in the region lying between the seismic trace portion studied and this reference level 200. The reference level 200 thus advantageously constitutes a level situated above a first disturbance of the medium.

Figure 3:
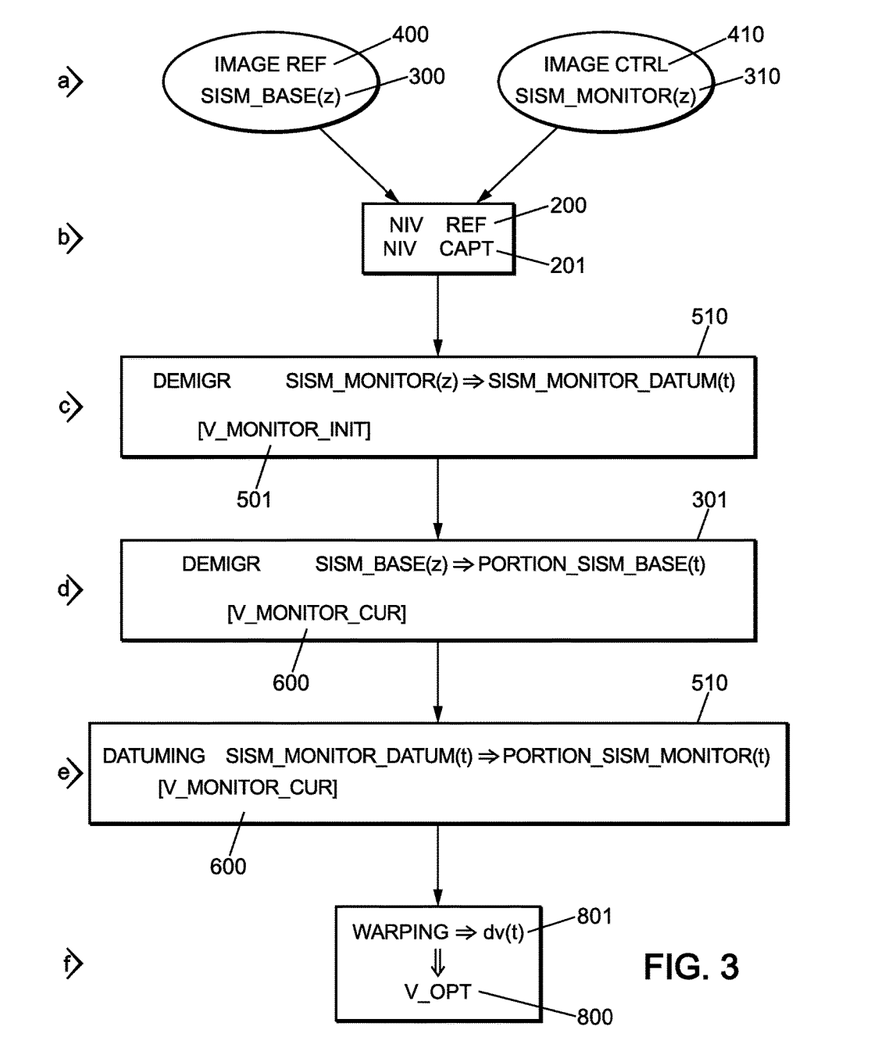
FIG. 3 is a flow chart showing six steps of the seismic image processing method.

The method of the invention involves two sets of seismic data for the same medium, processed in at least six steps illustrated in FIG. 3. A first set of seismic data issues from a reference image 400, and the other from a control image 410, the two sets of data being acquired at different times. Steps a) to f) in FIG. 3 are performed at least once during the method.

Step a) of the method consists in receiving a reference seismic image and at least one control seismic image. These images may comprise a plurality of seismic traces represented on a depth scale associated with coordinates z. Although not shown, a seismic wave detector initially detects data corresponding to amplitudes of seismic waves changing over time. The representation in time scale is modified by a transformation referred to as "migration" by applying a velocity model in order to obtain seismic traces represented in a depth scale. A first velocity model is used to obtain the seismic traces of the reference image, and another velocity model, which may be a so-called original velocity model, is used to transform by "migration" or to "migrate" the seismic traces of the control image. It should be noted here that the model that was used to supply the control image is a natural candidate for serving as a starting point, as an original model for steps b) to f). The velocity models are chosen according to standard criteria in geophysics.

Figure 4:
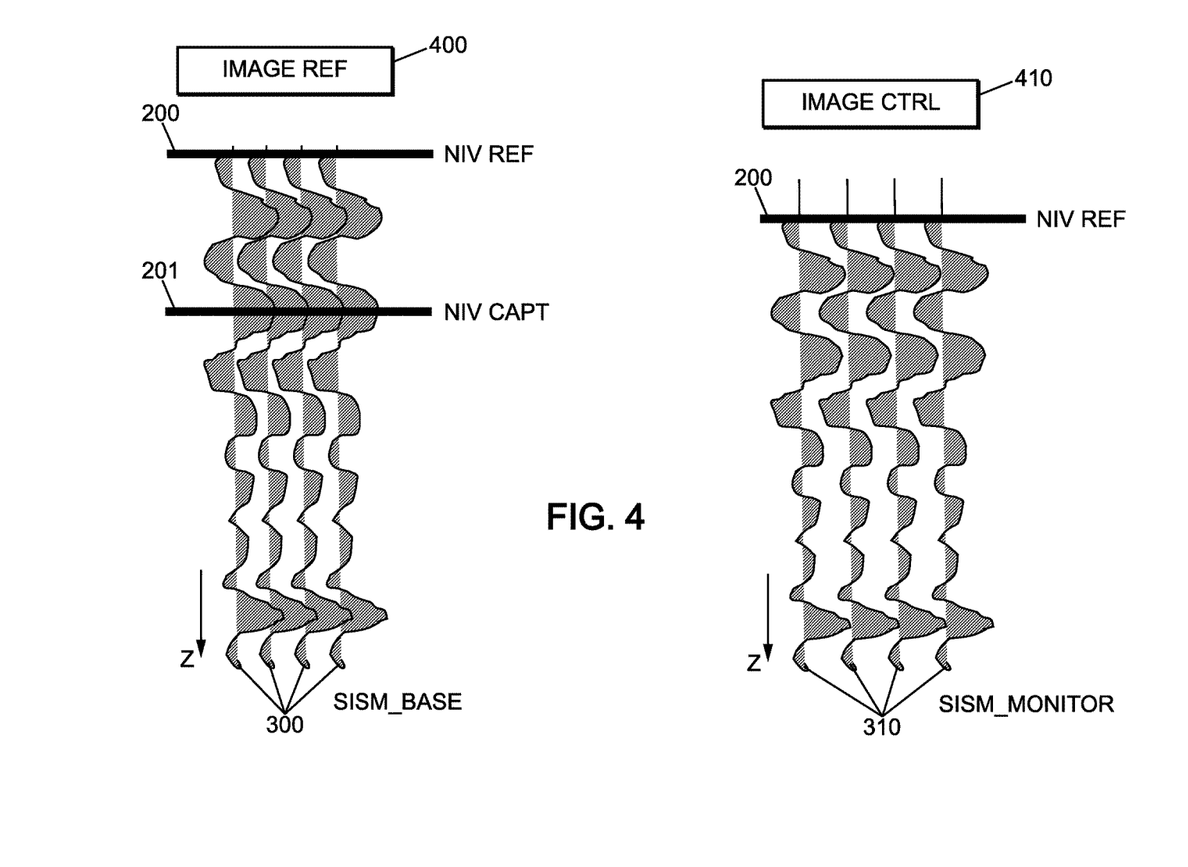
FIG. 4 is a schematic representation of seismic traces on a reference image and a control image.

Step b) consists in defining a first capture level 200 and at least a second capture level 201. FIG. 4 shows four seismic traces 300 on the reference image 400 and four seismic traces 310 on the control image 410. As illustrated in FIG. 4, a first capture level 200 may be defined as required on a seismic trace of the reference image or on a seismic trace of the control image. A second capture level 201 is preferably defined on a seismic trace of the reference image, the position on the depth scale of the second capture level 201 thus not being influenced by the velocity model chosen to form the seismic traces of the control image.

Figure 5:
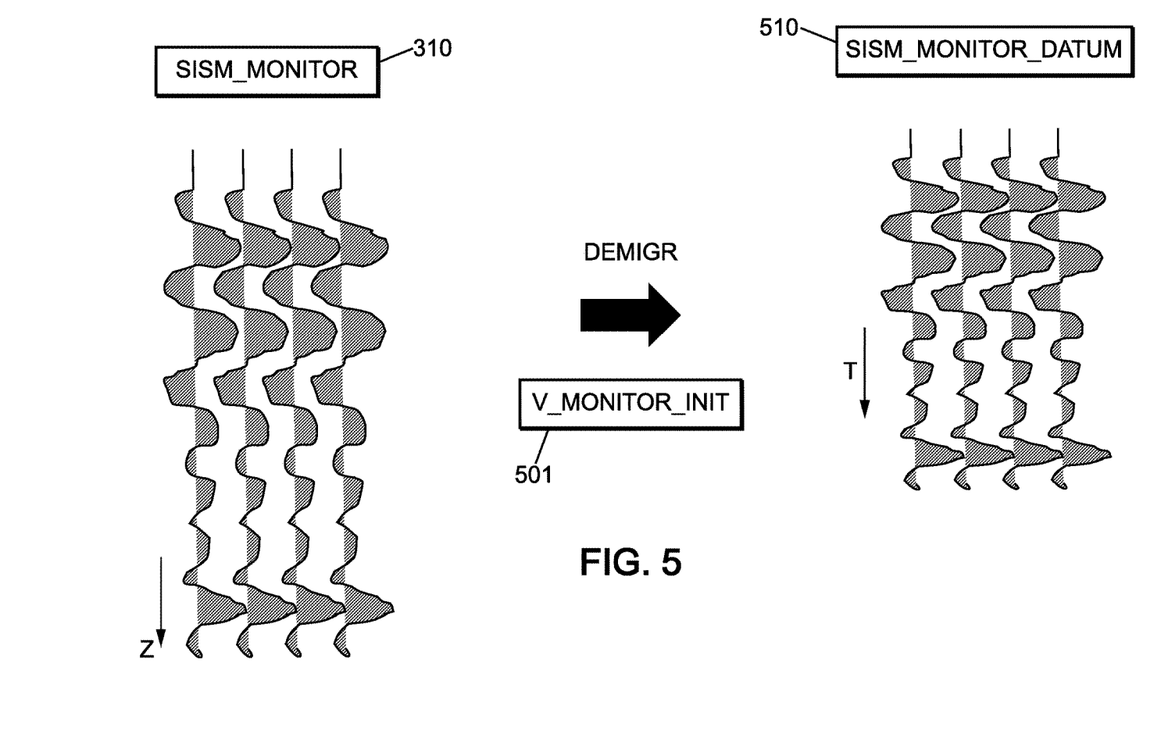
FIG. 5 is a schematic representation of seismic traces on a control image transformed by "demigration" and by means of an original velocity model.

Step c) of the method consists in transforming a or the seismic trace 310 of the control image 410 of the data on the first capture level 200. This operation is referred to as "demigration" and is a reverse operation to migration. The demigration transforms seismic traces from the depth scale to the time scale by means of a velocity model. The "datuming" operation for its part is highly similar and uses essentially the same tools. "Datuming" consists in transporting a set of seismic traces in time scale, recorded at a starting level, to an arrival level, as if they had been recorded at this new level. The demigration and "datuming" operations are not generally carried out trace to trace, but convert a set of starting traces into a new starting set. In the case of zero "offset", which concerns us here, these conversions are reversible. After demigration from the control image 410, the first capture level 200 is then called "datum" of the control seismic trace thus corrected. At the end of this demigration the data are shown as if they were received at the first capture level 200. The operation of transformation by demigration of step c) may be performed by any known means, such as for example by static correction or by application of propagation equations. FIG. 5 illustrates this step. The transformation of the seismic traces shown in the depth scale into seismic traces shown in a time scale is done by means of an original velocity model 501. Thus, at the end of step c), a control seismic trace transformed into time scale 510 is obtained.

Figure 6:
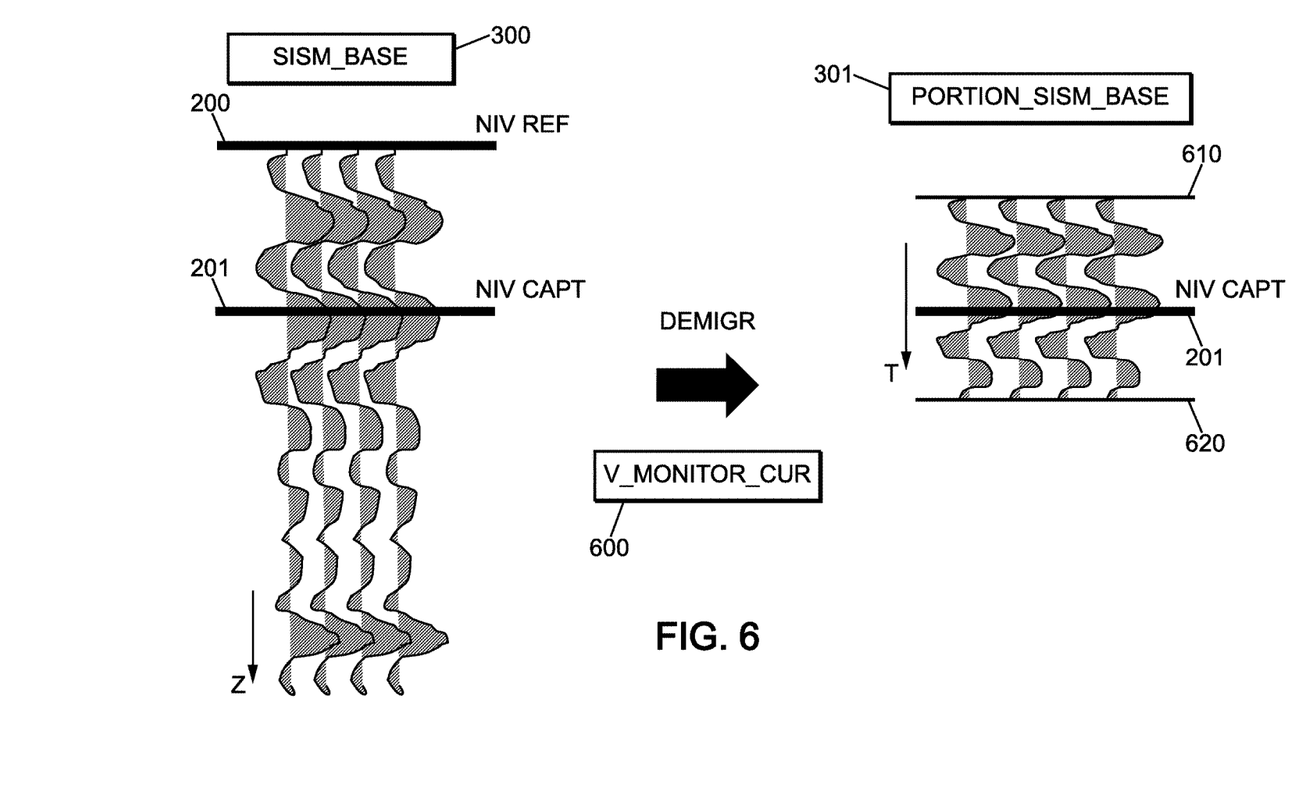
FIG. 6 is a schematic representation seismic traces on a reference image transformed by "demigration" by means of a current velocity model.

The following step d) consists in performing a demigration operation or a double demigration and "datuming" operation on (or to) the first capture level 200 of a or the seismic trace 300 of the reference image 400, using a current velocity model 600. FIG. 6 illustrates an embodiment in which a conversion is made to transform by demigration the seismic traces 300 in depth scale of the reference image 400 into a set of traces 301 in time scale associated with the same capture level 201.

The conversion of the traces 300 into traces 301 may be done either in two steps, by demigration to the reference level and then "datuming" to the capture level, or in a single step by demigration to the second capture level 201.

As illustrated in FIG. 6, the demigration or demigration followed by a "datuming" of step d) may be carried out on a portion of the reference seismic trace or traces 300. Thus one or more portions of transformed reference seismic traces may be obtained at the end of step d). These portions have the same time origin, situated at the second capture level 201, and are delimited between two boundaries 610 and 620 on either side of the second capture level 201. The choice of the boundaries 610, 620 falls to the user of the method. It should moreover be noted that it may be advantageous to provide portions of sufficiently great size by spacing apart the boundaries 610, 620. This is because, in the case of iterative implementation of the invention on a plurality of different capture levels, an overlap between adjacent portions provides a means of verifying the coherence of the velocity model obtained at adjacent seismic trace portions on capture levels that follow each other.

It is clear that, at the end of the step, the transformed control seismic trace 510 is depicted on a time scale, on the same "datum" as the portion 301 of the transformed reference seismic trace. The "datum" defines a new time origin on the time scale. Thus data situated on either side of the "datum" have time coordinates of opposite signs. However, these two traces are not yet comparable since the transformations of the traces of the reference image and of the traces of the control image were made by means of two different velocity models 500, 600.

They would be comparable if the two velocity models 500 and 600 used were the respective actual velocity models that are not known. These traces would be relatively comparable and would be differentiated only by a simple gradual temporal offset that it would be possible to deal with by conventional analysis methods, if the medium was strictly 1D stratified. However, 4D imaging is not situated in these two particular cases. In general, these two traces are comparable only for a limited time window around the zero time of the time scale associated with the "datum". The basic idea used in the following step e) is precisely that a temporal offset is measurable, 1D, in a time window centred on the zero time after "demigration" or "datuming". It suffices to create a time window centred on a zero at a sufficient number of capture levels to be able to make the two traces comparable.

Figure 7:
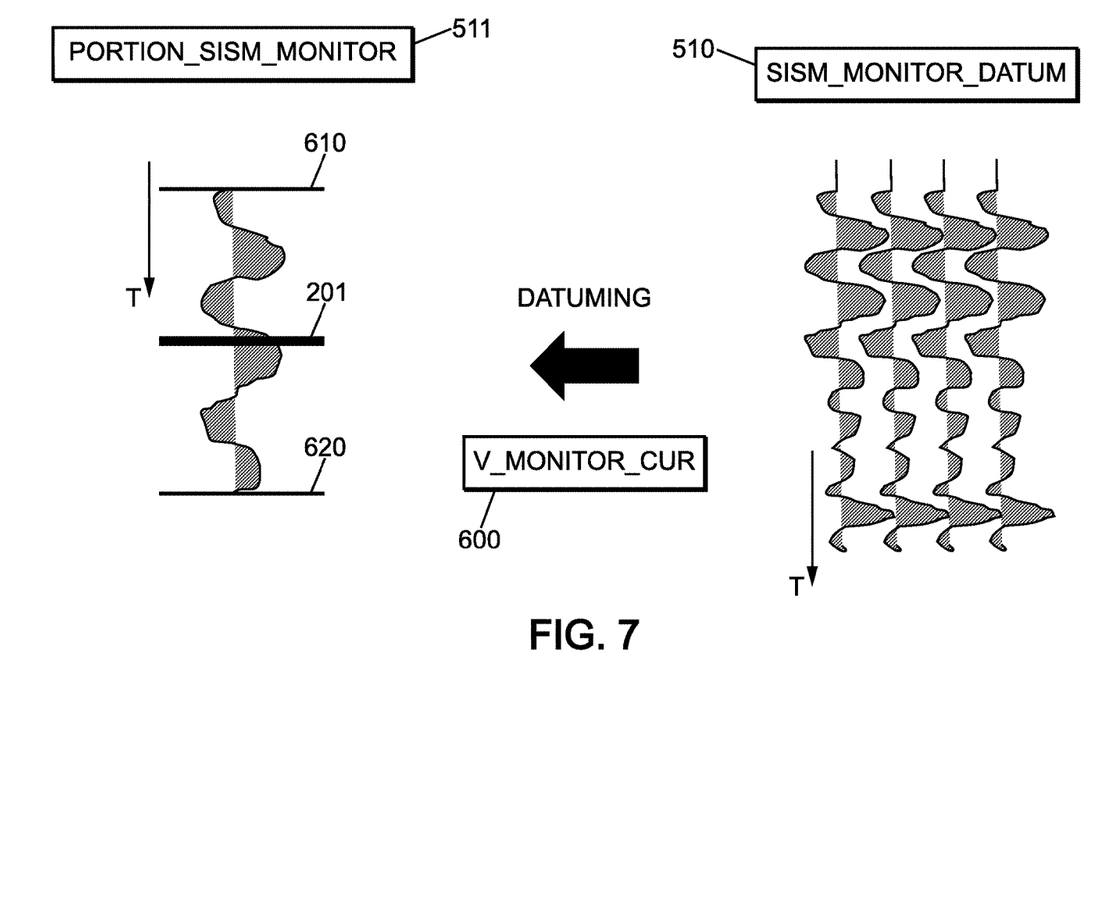
FIG. 7 is a schematic representation of the processed control seismic traces of FIG. 5, corrected by "datuming" by means of the current velocity model.

Step e) performs a supplementary operation making it possible to make the portion 301 of the transformed reference seismic trace and the transformed control seismic trace 510 comparable. This step, illustrated in FIG. 7, consists in carrying out a second transformation by "datuming" on the second capture level 201 of a or the transformed control seismic trace 510 this time using the current velocity model 600. Like what was done at step d), step e) may involve the selection of a seismic trace portion in order to obtain a new transformed control seismic trace portion 511. This new transformed control seismic trace portion 511 corresponds to a portion that has as its time origin the second capture level 201, and is delimited between two boundaries 610, 620, identical to the boundaries 610, 620 that can be defined at step d).

It should be noted that the definition of the boundaries 610, 620 in steps d) and e) is an optional step. The presence of these boundaries makes it possible to simplify the manipulation of the data by reducing the number of data items to be processed, in particular when the complete seismic traces imply large quantities of data.

At the end of step e) the portion 301 and the new portion 511 of seismic traces were obtained by "datuming" on the same planar level by means of the current velocity model 600. They are therefore comparable since they are both represented in time scale, in a time window centred on the same time origin corresponding to the second capture level 201.

Figure 8:
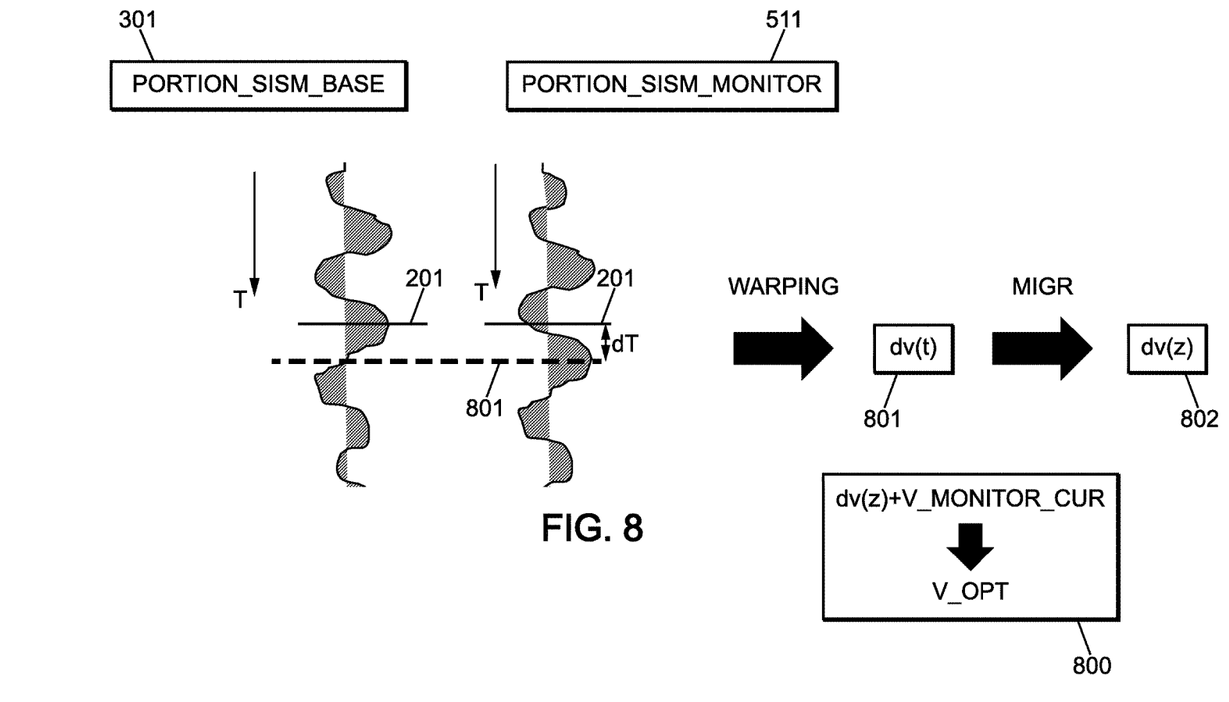
FIG. 8 is a schematic representation of reference and control seismic trace portions put side by side with a view to determining a correction factor for the current velocity model.

As illustrated in FIG. 8, the method next uses at step f) a comparison technique for determining delays between corresponding components of the portions of the seismic traces 301, 511 with a view to extracting a correction factor for the velocity. This correction factor can then be used by known methods such as for example a simple imaging method for determining the value that it is necessary to add to the velocity of the current velocity model 600 in order to update it and obtain an optimised current velocity model 800.

A particularly simple means for implementing step f) by means of existing methods consist in measuring the global time offset dT between the two portions 301 and 511 of seismic traces. As illustrated in FIG. 8, the portions 301 and 511 are portions of seismic traces represented in time scale in the same time window, which may for example be delimited by boundaries 610 and 620. However, the signals of the two portions 301, 511 corresponding to two trips of a seismic wave on the same path in the same medium, measured at two different instants, greatly resemble each other at the vicinity of the second capture level 201. To estimate the offset dT between these two portions, it is for example possible to use known techniques of correlation between seismic traces. In this way, it is possible to identify, on the new control seismic trace portion 511, the level 810 associated with the corresponding signal on the second capture level 201 on the reference seismic trace portion 301.

The offset dT identified can be converted into a velocity using for example a so-called "warping" technique. The velocity dv(t) can next be migrated in order to obtain a velocity dv(z) that can be added to the current velocity model 600. In addition to the known techniques of the prior art for determining a correction factor for a velocity model from an offset in time between two seismic trace portions, the invention proposes two different methods for performing step f).

A first method for implementing step f) consists in identifying the function dv(t) of the velocity differences making it possible to transform, point by point, the transformed reference seismic trace portion 301 into the transformed control seismic trace portion 511. This operation is commonly referred to as "warping" and is a normal known method in geophysics. The function dv(t) 801 can be represented as a trace of the velocity variations in the time scale. It is then necessary, to convert this function into the depth scale, to transform it by migration. This migration to the depth scale can advantageously be done by means of the current velocity model 600, in order to obtain a trace of the velocity variations dv(z) 802 in the depth scale. It then suffices to add, for each coordinate z, the term dv(z) corresponding to the corresponding values of the current velocity model 600 in order to obtain the optimised velocity model 800.

An alternative implementation of step f) consists firstly in finding the same function dv(t) 801 by "warping". Next, a transformation to the depth scale is implemented by a technique commonly referred to as "attribute migration" in geophysics. This technique consists in choosing any seismic trace represented in the time scale, for example one of the two portions 301 or 511. This chosen trace then serves as a support trace. The support trace is migrated by means of the current velocity model 600. A second migration by means of the current velocity model 600 is performed on a modified support trace by term by term multiplication by the function dv(t). In order to obtain the correction factor dv(z) 802 of the current velocity model 600, it suffices to effect the ratio between the migrated modified support trace and the migrated support trace. The optimised current velocity model 800 is obtained by adding the correction factor 802 to the current velocity model 600.

One implementation of the method in a single step without repetitions was described above. It is however possible to improve the method by performing steps d) to f) iteratively, as illustrated on the flow diagram in FIG. 9. This iteration is done by replacing, at the end of an iteration loop, the current velocity model 600 that will serve for the following iteration loop by the optimised current velocity model 800 determined. Each iteration loop makes the optimised current velocity model converge to a value more representative of the medium corresponding to the data of the control image.

Figure 9:
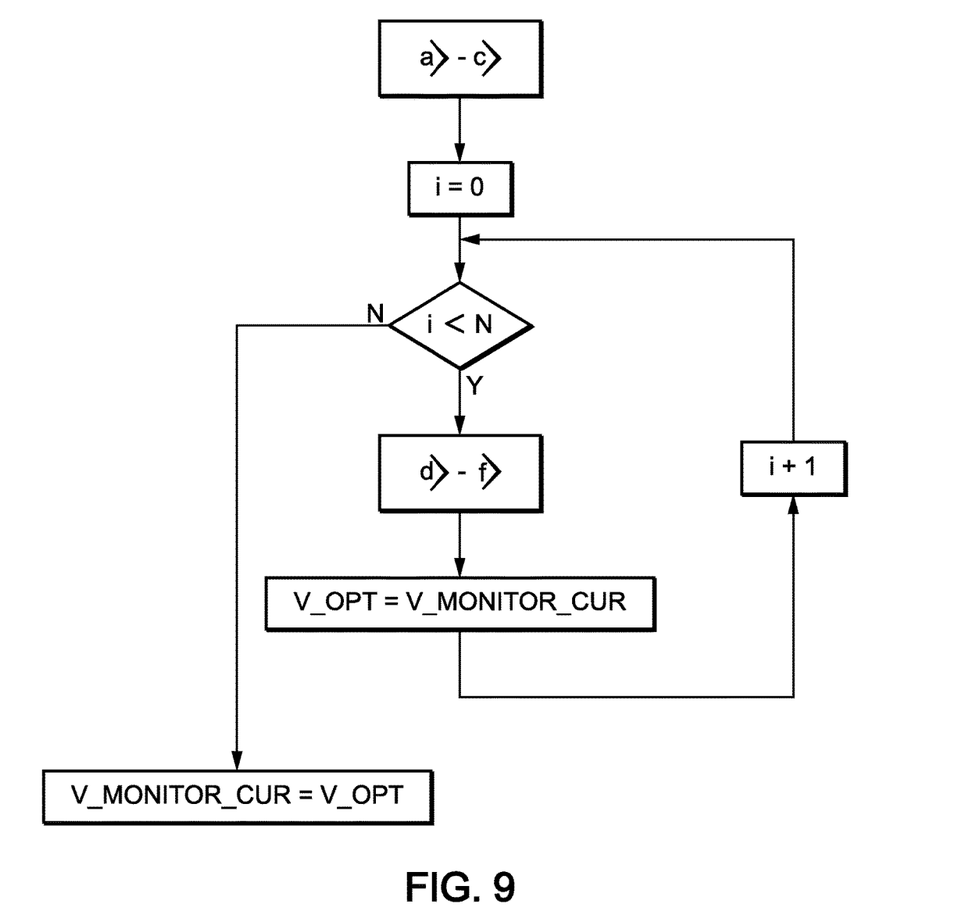
FIG. 9 is a flow diagram showing the iteration of the seismic image processing method.

The number of iterations N may be chosen according to various criteria. It is for example possible to fix it at a predetermined value, corresponding to a compromise between processing time and reliability of the result obtained. It is also possible to determine a difference threshold value for the difference between the current velocity model 600 and the optimised current velocity model 800. By defining a difference threshold value, it is possible to cease an iteration when the difference is below said threshold. It is thus possible to implement the method only locally in the portions of seismic traces for which significant differences remain between current velocity model and optimised current velocity model, and to cease the method in the seismic trace portions comprising few variations between the two velocity models.

In this regard, it must be stated that the method can be implemented by redefining the positions on the depth scale of the planar levels after each iteration. Such a redefinition of the position of the planar levels makes it possible to further reduce the duration of the processing according to the invention, and to concentrate the computing efforts in the region of the medium comprising the most change. It also makes it possible to refine the model selectively in the regions where the variations in the velocity model over time are the smallest, and require a high resolution.

A second iteration level may also be implemented by means of the method. This second iteration level consists of implementing the method on various portions of the control and reference seismic traces. By defining a plurality of capture levels ranging from a first capture level close to the point of emission of the seismic waves to a last capture level, the method effects a meshing of the seismic signals. The method is implemented gradually for seismic trace portions transformed by demigration and corrected by "datuming" on successive capture levels. This pruning of the seismic data is done so that, at the end of step f), a new step g) is introduced so that the capture levels are renumbered. Thus, at the end of the first iteration, the second capture level is named the first capture level and the third capture level is named the second capture level. In this way, the method makes it possible to gradually transform the data until the last capture level initially defined is named the first capture level.

The invention also relates to a computer program product implementing steps a) to f) described above, in particular when the steps are implemented by means of a computer processor.

The invention is not limited to the embodiments described above and may be varied in alternative embodiments.

In particular, although a plurality of capture levels 210, 220, 230 have been shown in FIG. 2, the invention may entirely allow effective and sufficient monitoring of a medium from two planar levels consisting of a reference level and a single second capture level. It may also be advantageous to reduce the number of capture levels with a view to reducing the duration of implementation of the method.

The current velocity model chosen initially may for example be the original velocity model used for "demigrating" the seismic traces of the control image. However, it is possible to choose any other current velocity model as the starting point, for example the first velocity model that was used for "migrating" the traces of the reference image. Any other velocity model, for example a velocity model intermediate between the first model and the original velocity model, may also be chosen.

The invention described above preferentially applies to seismic profiles with zero mismatch, also referred to as zero offset seismic profiles, that is to say data corresponding to seismic data on an "auto collimating" path from a source to a reflector in the subsoil and returning by the same path to a receiver situated at the same place as the source. However, implementing the invention on non-zero offset seismic data, that is to say with non-zero offset between emitter and receiver, can also be envisaged.

The method described above had been applied to one pair of reference and control seismic data. It is of course possible to implement this method successively on a plurality of pairs of seismic data with a view to monitoring the change in a medium image by image over a long period.

The invention claimed is:

1. A method for processing a reference seismic image of a medium and a control seismic image of said medium, the reference seismic image comprising at least one seismic trace expressed in a depth scale and the control seismic image comprising at least one seismic trace expressed in the depth scale, the method comprising:
    a) receiving the reference seismic image and the control seismic image;
    b) defining at least one first planar capture level situated on one trace from among the at least one seismic trace of the reference seismic image and the at least one seismic trace of the control seismic image, and at least one second planar capture level on the at least one seismic trace of the reference seismic image, said first planar capture level being defined above a first disturbance of said medium;
    c) transforming a continuous portion of the at least one seismic trace of the control seismic image by demigration on the at least one first planar capture level by means of an original velocity model, into a transformed control seismic trace described in a time scale;
    d) transforming a continuous portion of the at least one seismic trace of the reference seismic image comprising the at least one second planar capture level by demigration and datuming operations on the at least one second planar capture level by means of a current velocity model, into a transformed reference seismic trace portion described in the time scale;

e) correcting the portion of the transformed control seismic trace by calibration on the at least one second planar capture level by means of the current velocity model in a new transformed control seismic trace portion described in the time scale said calibration being a transformation by datuming operation;

f) determining an optimised current velocity model by the addition, to the current velocity model, of a correction factor for the current velocity model determined from an offset in time between the portion of the transformed reference seismic trace and the new transformed control seismic trace portion; and g) monitoring a change over time in the imaged medium of oil/gas reservoirs in a subsoil based on said optimized current velocity model.

2. The method of claim 1, wherein f) further comprises:
calculating a function dv(t) representing change over time in instantaneous velocity making it possible to transform the transformed reference seismic trace portion into the new transformed control seismic trace portion; and transforming the function dv(t) into a function dv(z) representing instantaneous velocity on the depth scale, by means of the current velocity model, the function dv(z) forming a correction factor for the current velocity model.

3. The method of claim 1, wherein f) further comprises:
calculating a function dv(t) representing change over time in instantaneous velocity making it possible to transform the transformed reference seismic trace portion into the new transformed control seismic trace portion;

multiplying the function dv(t) by any one of the at least one seismic traces described in the time scale, said any one of the at least one seismic traces described in the time scale forming a support trace;

transforming, using the current velocity model, the support trace and the support trace multiplied by the function dv(t) into second and third transformed traces described in the depth scale; and determining a correction factor dv(z) representing value of instantaneous velocity on the depth scale, of the current velocity model, said correction factor being a ratio between second and third transformed traces described in the depth scale.

4. The method of claim 1, wherein the at least one seismic trace of the control seismic image and the at least one seismic trace of the reference seismic image are traces corresponding to zero-offset seismic profiles.

5. The method of claim 1, wherein the current velocity model is chosen as being the original velocity model.

6. The method of claim 1, wherein transformation by demigration and datuming operations at d) consists of demigration on the at least one first planar capture level by means of the current velocity model followed by a correction by calibration on the at least one second planar capture level by means of the current velocity model.

7. The method of claim 1, wherein steps d) to f) are repeated iteratively a chosen number of times, the optimised current velocity model determined at the end of an iteration serving as a current velocity model for a consecutive iteration.

8. The method according to claim 1, wherein the at least one first planar capture level and the at least one second planar capture level are redefined at the start of each iteration of the method.

9. The method according to claim 1, further comprising:
defining a plurality of capture levels comprising the at least one first planar capture level, the at least one second planar capture level, and at least one third planar capture level, said plurality of capture levels ranging successively, by increasing depth according to the depth scale, from the at least one first planar capture level to an at least one last planar capture level, between b) and c); and at the end of f), the method further comprises:

g) naming the at least one second planar capture level as the at least one first planar capture level and naming the at least one third planar capture level as the at least one second planar capture level, and steps c) to g) being implemented iteratively until the at least one last planar capture level is named the at least one first planar capture level.

10. A non transitory computer readable storage medium having stored thereon a computer program comprising program instructions, the computer program being loadable into a data-processing unit and adapted to cause the data-processing unit to carry out the method of claim 1 when the computer program is executed by the data-processing device.

* * * * *